United States Patent
Jung et al.

(10) Patent No.: US 10,939,455 B2
(45) Date of Patent: Mar. 2, 2021

(54) METHOD FOR ALLOCATING PRIORITIES TO A LOGICAL CHANNEL GROUP IMPLICITLY IN A D2D COMMUNICATION SYSTEM AND DEVICE THEREFOR

(71) Applicant: LG ELECTRONICS INC., Seoul (KR)

(72) Inventors: Sunghoon Jung, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 16/064,351

(22) PCT Filed: Nov. 16, 2016

(86) PCT No.: PCT/KR2016/013196
§ 371 (c)(1),
(2) Date: Jun. 20, 2018

(87) PCT Pub. No.: WO2017/111316
PCT Pub. Date: Jun. 29, 2017

(65) Prior Publication Data
US 2018/0359765 A1    Dec. 13, 2018

Related U.S. Application Data

(60) Provisional application No. 62/270,595, filed on Dec. 22, 2015.

(51) Int. Cl.
*H04W 72/10*    (2009.01)
*H04W 88/04*    (2009.01)
*H04W 92/18*    (2009.01)

(52) U.S. Cl.
CPC ............ *H04W 72/10* (2013.01); *H04W 88/04* (2013.01); *H04W 92/18* (2013.01)

(58) Field of Classification Search
CPC ...... H04W 72/10; H04W 92/18; H04W 88/04
(Continued)

(56) References Cited

U.S. PATENT DOCUMENTS

2014/0185529 A1    7/2014  Lim et al.
2015/0181461 A1*   6/2015  Kim .................. H04W 74/08
                                                    370/236

(Continued)

FOREIGN PATENT DOCUMENTS

WO    WO 2015/142082 A1    9/2015

OTHER PUBLICATIONS

R2-156271; 3GPP TSG-RAN WG2 Meeting #92, Anaheim, USA, Nov. 16-20, 2015; Source: ITRI; (Year: 2015).*

(Continued)

*Primary Examiner* — Hassan A Phillips
*Assistant Examiner* — Mohammed S Chowdhury
(74) *Attorney, Agent, or Firm* — Birch, Stewart, Kolasch & Birch, LLP

(57) ABSTRACT

The present invention relates to a wireless communication system. More specifically, the present invention relates to a method and a device for allocating priorities to a logical channel group implicitly in a D2D communication system, the method comprising: receiving information including N numbers of priority lists in order of increasing logical channel group identity from an eNB, associating each of the N numbers of priority lists with each of the N numbers of logical channel groups in an order corresponding to a sequential order of the information, when a sidelink logical channel with a first priority is configured, allocating the sidelink logical channel with the first priority to a logical channel group associated with the first priority.

8 Claims, 8 Drawing Sheets

[Table A] LCG ID

|      | LCG ID  |
|------|---------|
| LCG1 | 00 (=0) |
| LCG2 | 01 (=1) |
| LCG3 | 10 (=2) |
| LCG4 | 11 (=3) |

[Table B] logicalChGroupInfoList Information Element

| order of lists | contents |
|---|---|
| List 1 | PPPP0 |
| List 2 | PPPP1, PPPP2 |
| List 3 | PPPP3, PPPP4 |
| List 4 | PPPP5, PPPP6, PPPP7, PPPP8, |

[Table C] association with LCG-PPPP

| LCG1 | List 1 | PPPP0 |
|---|---|---|
| LCG2 | List 2 | PPPP1, PPPP2 |
| LCG3 | List 3 | PPPP3, PPPP4 |
| LCG4 | List 4 | PPPP5, PPPP6, PPPP7, PPPP8, |

[Table D] allocation of logical channels to LCGs

| LC | PPPP | LCG |
|---|---|---|
| LC #1 | PPPP1 | LCG2 |
| LC #2 | PPPP2 | LCG2 |
| LC #3 | PPPP3 | LCG3 |

(58) Field of Classification Search
USPC .......................................................... 370/329
See application file for complete search history.

(56) References Cited

U.S. PATENT DOCUMENTS

2017/0127405 A1* 5/2017 Agiwal ............. H04W 72/0413
2017/0245292 A1* 8/2017 Agiwal ................ H04W 28/02
2017/0257876 A1* 9/2017 Loehr ................... H04W 72/10

OTHER PUBLICATIONS

R2-156397; 3GPP TSG-RAN WG2 #91Bis, Anaheim, USA, Nov. 16-20, 2015;Source: Coolpad; (Year: 2015).*
R2-156761 ; 3GPP TSG-RAN WG2 Meeting #92, Anaheim, USA, Nov. 16-20, 2015;Source: LG Electronics (Year: 2015).*
Ericsson, "Prioritization rules between resource pools", R1-145154, 3GPP TSG-RAN WG1 Meeting #79, San Francisco, USA, Nov. 17-21, 2014, pp. 1-3.
Huawei et al, "Priority handling based on ProSe Per Packet Priority", R2-156533, 3GPP TSG-RAN WG2 Meeting #92, Anaheim, US, Nov. 16-20, 2015, pp. 1-4.
LG Electronics Inc., "Reporting PPPP information for LCG-PPPP mapping", R2-156761, 3GPP TSG-RAN WG2 Meeting #92, Anaheim, USA, Nov. 16-20, 2015, pp. 1-2.
Catt, "Mapping Between PPP and LCG ID," 3GPP TSG RAN WG2 Meeting #91 bis, R2-154050, Malmo, Sweden, Oct. 5-9, 2015 (Oct. 4, 2019), pp. 1-3, XP051040264.
Ericsson, "Introduction of eD2D," Change Request, 3GPP TSG-RAN WG2 Meeting #92, R2-157150, Anaheim, USA, Nov. 16-20, 2015 (Dec. 11, 2015), 23 pages, XP051064969.
"3rd Generation Partnership Project; Technical Specification Group Radio Access Network; Evolved Universal Terrestrial Radio Access (E-Utra); Radio Resource Control (RRC); Protocol Specification (Release 13)", 3GPP TS 36.331, vol. 13.0.0, Dec. 2015, pp. 1-510. XP051065111.

* cited by examiner

[Fig. 1]
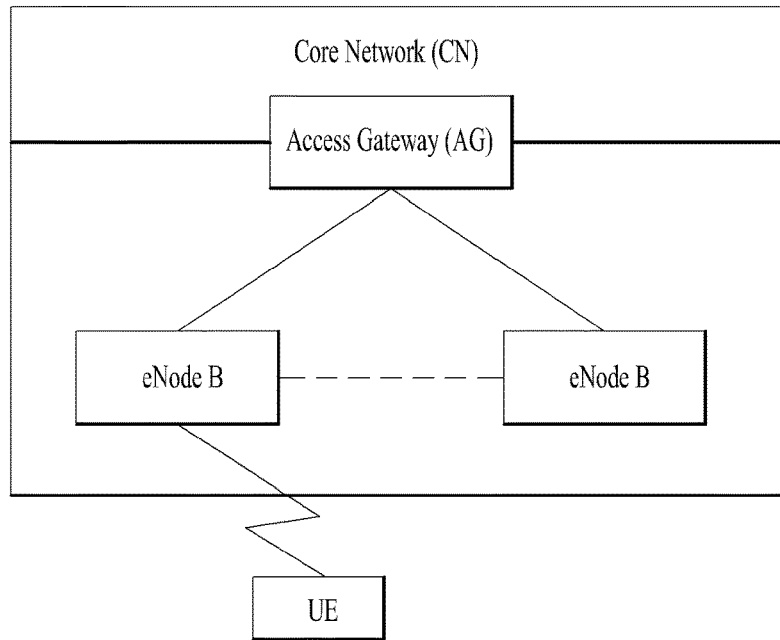
[Fig. 2A]
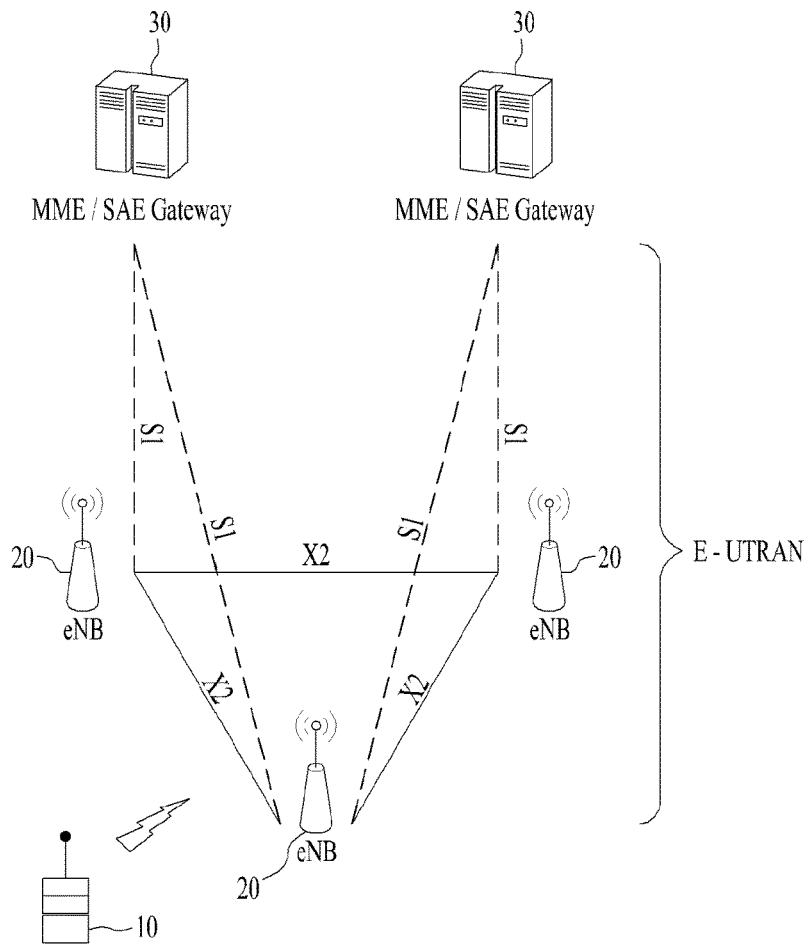

[Fig. 2B]
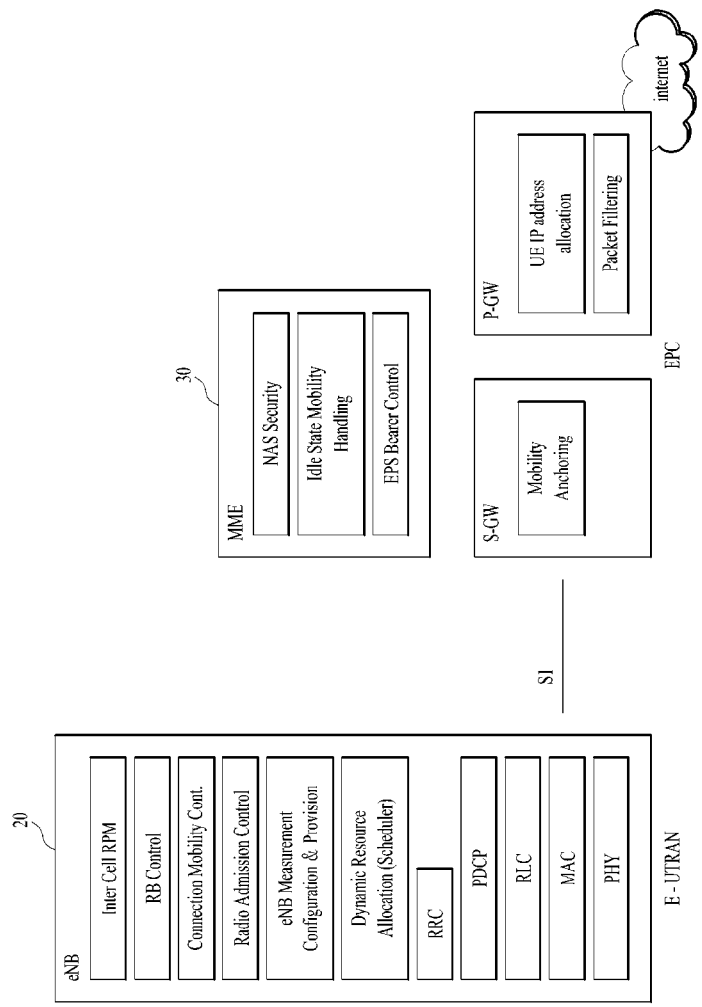

[Fig. 3]
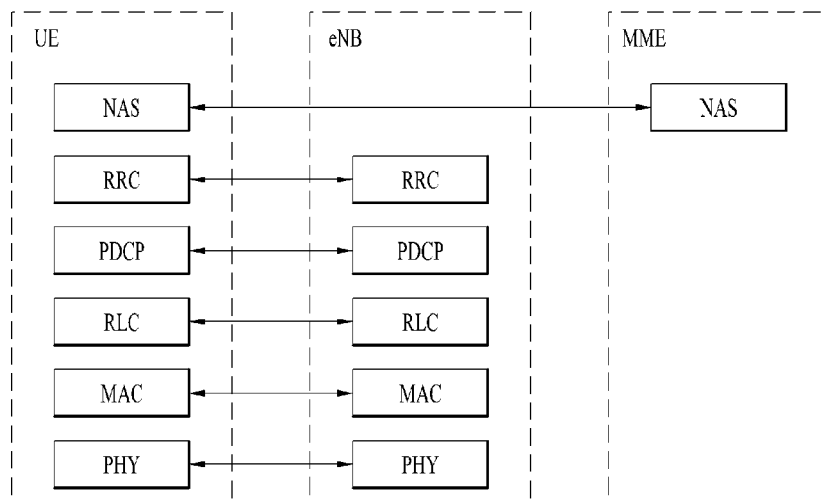
(a) Control-Plane Protocol Stack
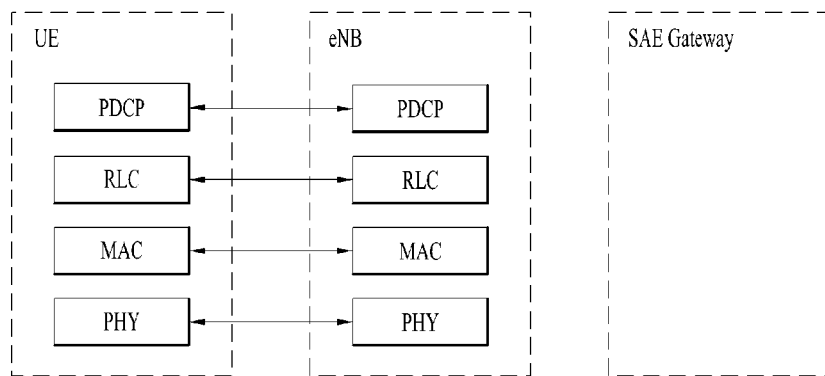
(b) User-Plane Protocol Stack
[Fig. 4]
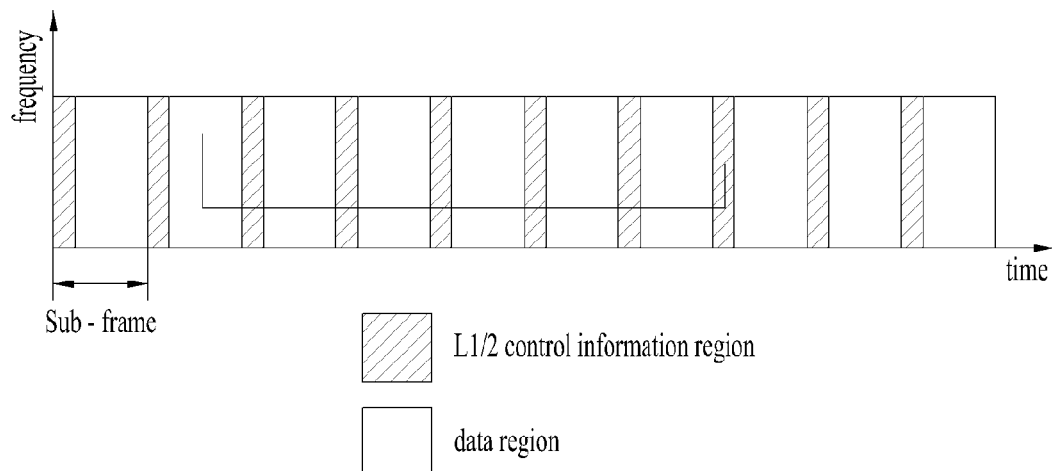

[Fig. 5]
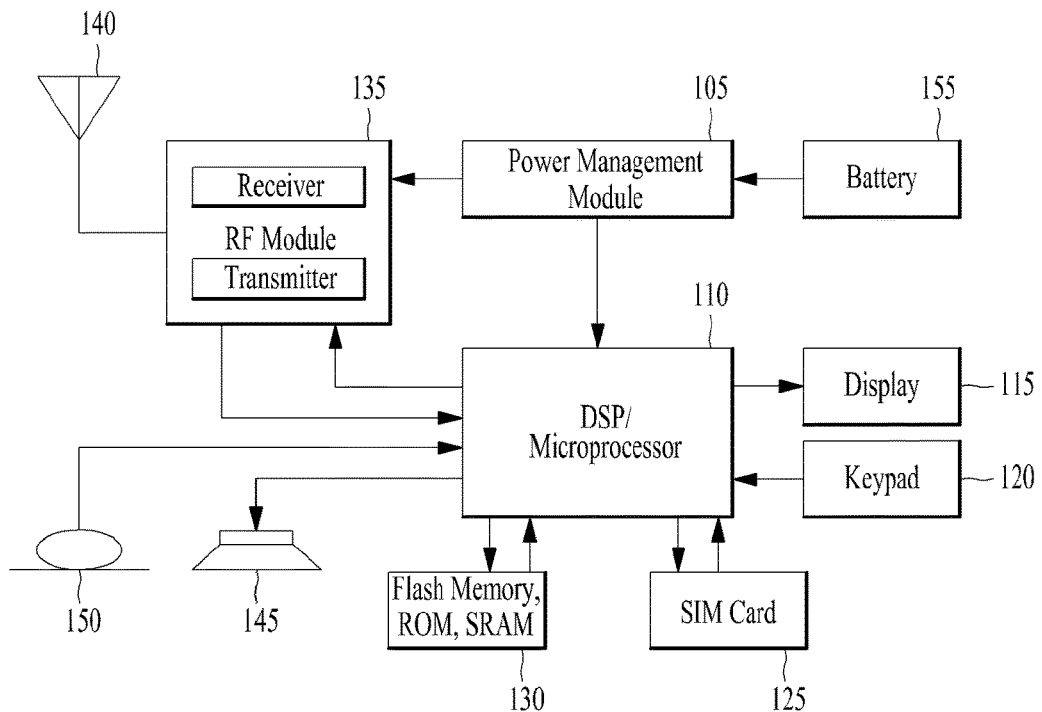
[Fig. 6]
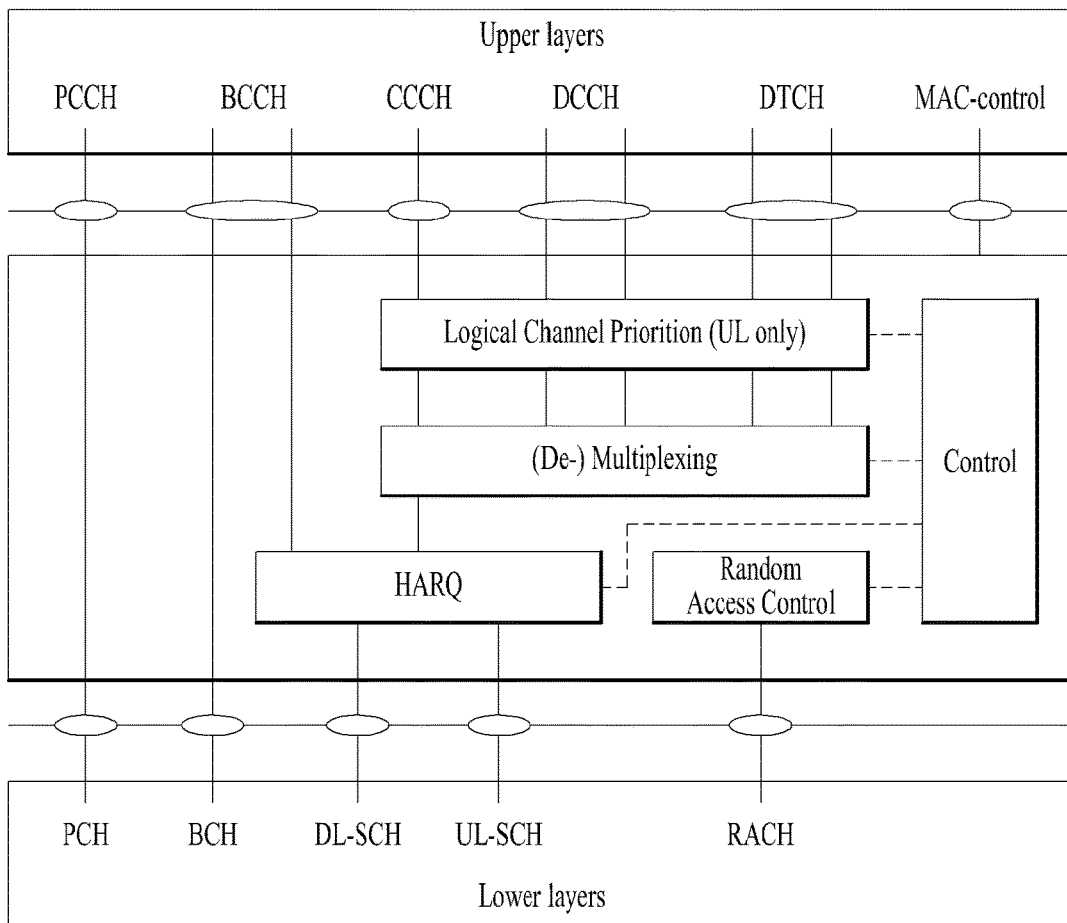

[Fig. 7]
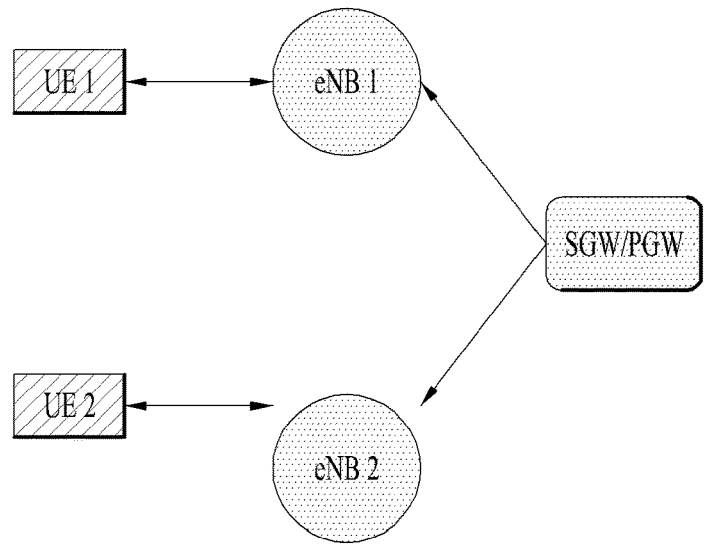
[Fig. 8]
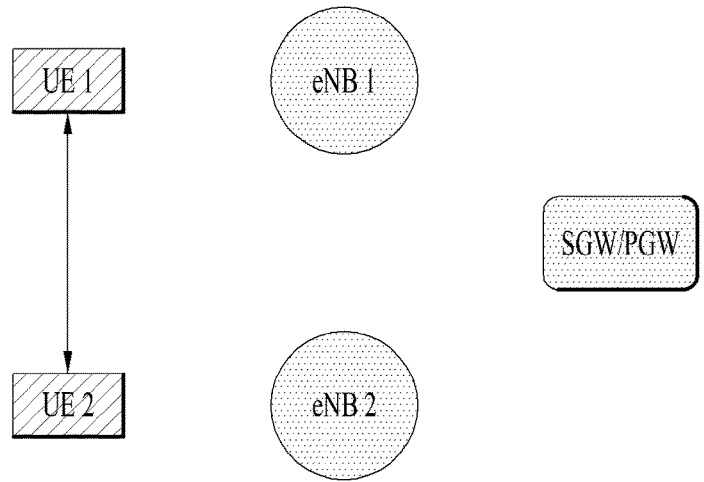
[Fig. 9]
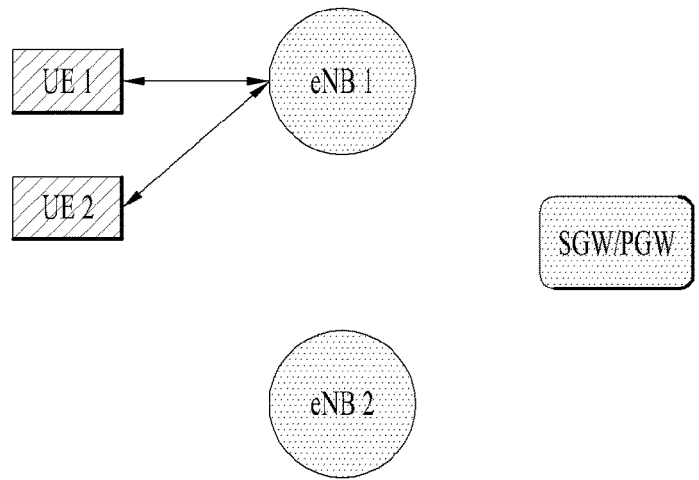

[Fig. 10]
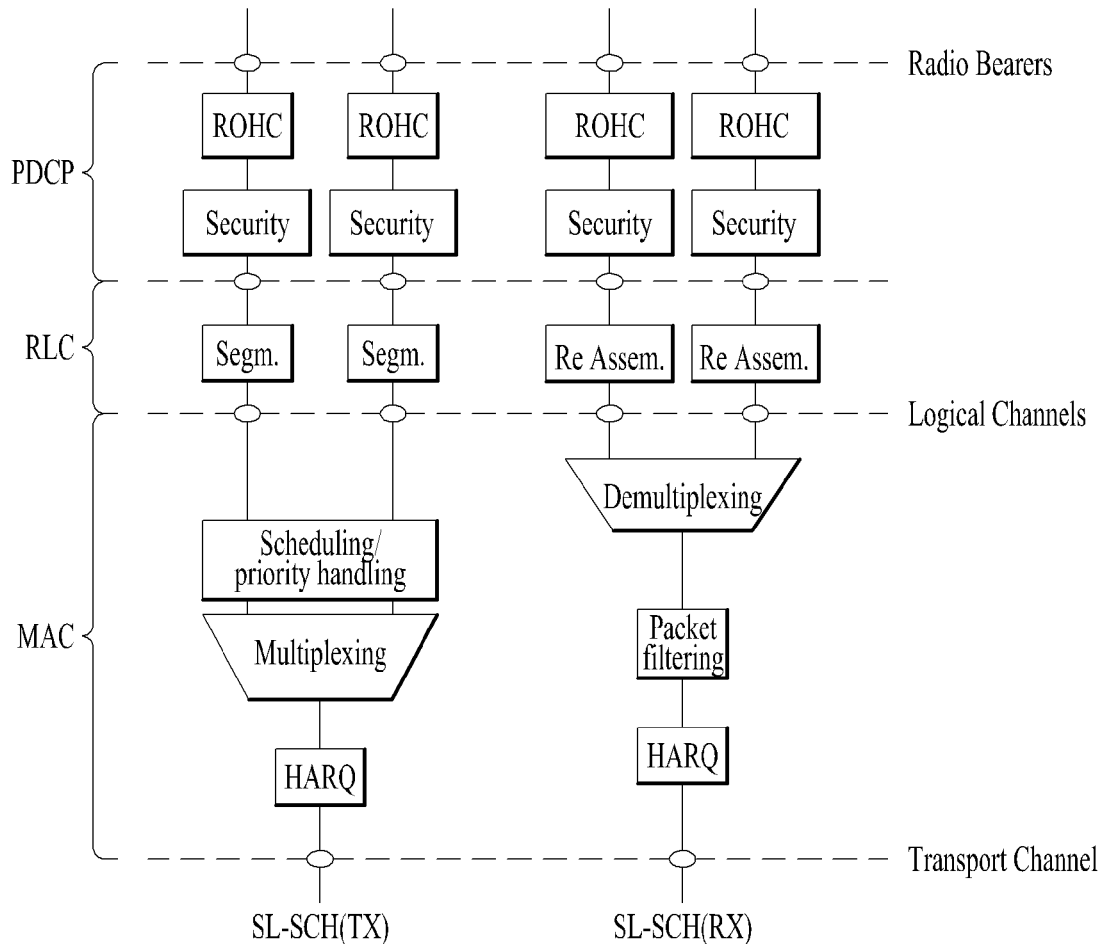
[Fig. 11A]
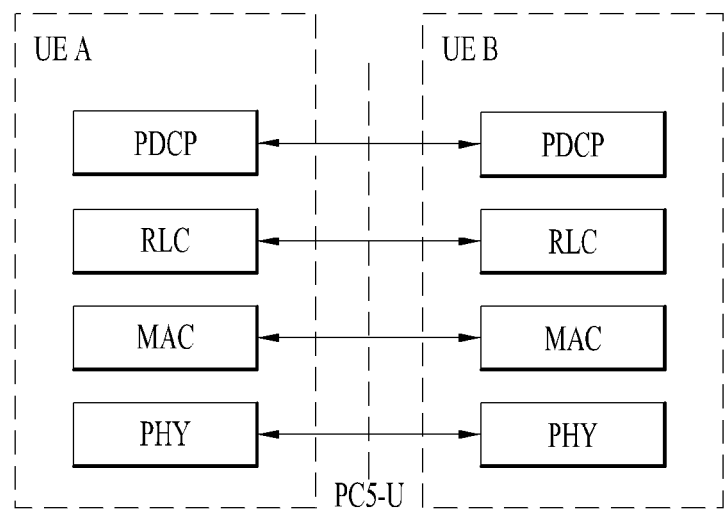

[Fig. 11B]
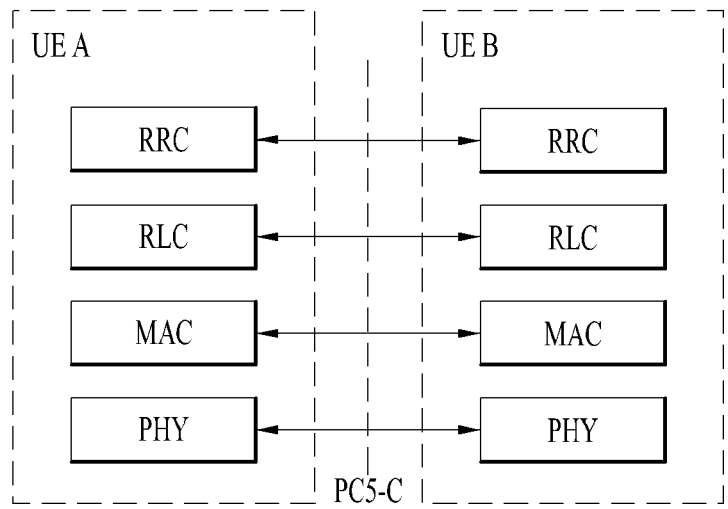
[Fig. 12]
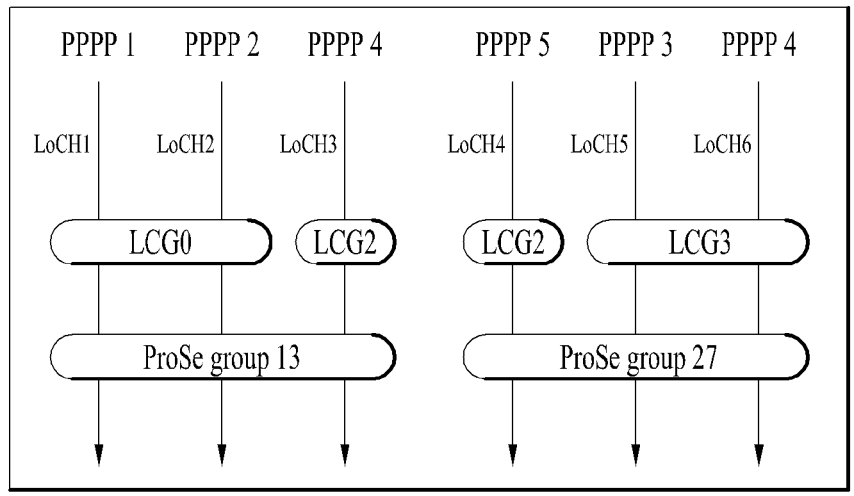
[Fig. 13]
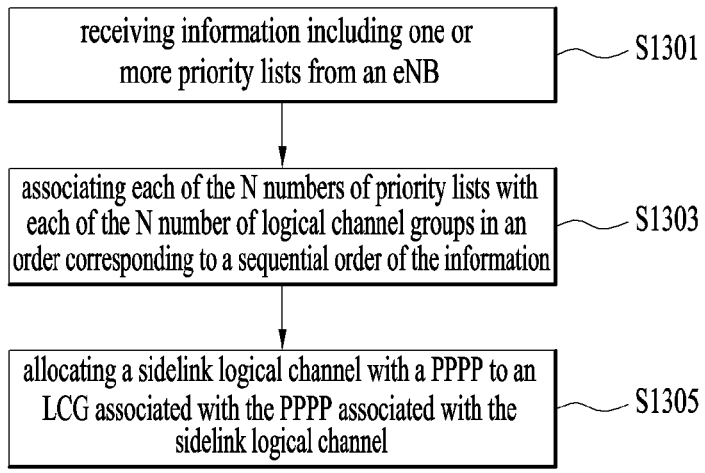

[Fig. 14]

[Table A] LCG ID

|  | LCG ID |
|---|---|
| LCG1 | 00 (=0) |
| LCG2 | 01 (=1) |
| LCG3 | 10 (=2) |
| LCG4 | 11 (=3) |

[Table B] logicalChGroupInfoList Information Element

| order of lists | contents |
|---|---|
| List 1 | PPPP0 |
| List 2 | PPPP1, PPPP2 |
| List 3 | PPPP3, PPPP4 |
| List 4 | PPPP5, PPPP6, PPPP7, PPPP8, |

[Table C] association with LCG-PPPP

| LCG1 | List 1 | PPPP0 |
| LCG2 | List 2 | PPPP1, PPPP2 |
| LCG3 | List 3 | PPPP3, PPPP4 |
| LCG4 | List 4 | PPPP5, PPPP6, PPPP7, PPPP8, |

[Table D] allocation of logical channels to LCGs

| LC | PPPP | LCG |
|---|---|---|
| LC #1 | PPPP1 | LCG2 |
| LC #2 | PPPP2 | LCG2 |
| LC #3 | PPPP3 | LCG3 |

METHOD FOR ALLOCATING PRIORITIES TO A LOGICAL CHANNEL GROUP IMPLICITLY IN A D2D COMMUNICATION SYSTEM AND DEVICE THEREFOR

CROSS REFERENCE TO RELATED APPLICATIONS

This application is the National Phase of PCT International Application No. PCT/KR2016/013196, filed on Nov. 16, 2016, which claims priority under 35 U.S.C. 119(e) to U.S. Provisional Application No. 62/270,595, filed on Dec. 22, 2015, all of which are hereby expressly incorporated by reference into the present application.

TECHNICAL FIELD

The present invention relates to a wireless communication system and, more particularly, to a method for allocating priorities to a logical channel group implicitly in a Device to Device (D2D) communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE OF INVENTION

Technical Problem

An object of the present invention devised to solve the problem lies in a method and device for a method for transmitting a BSR in a D2D communication system. The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

According to the present invention, it is possible to ensure that an eNB can schedule sidelink (SL) data having higher Per-Packet Priority (PPP) to be transmitted in a timely manner, by using inequal number mapping between PPP and logical channel group (LCG).

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 is a diagram for MAC structure overview in a UE side;

FIG. 7 is an example of default data path for a normal communication;

FIGS. 8 and 9 are examples of data path scenarios for a proximity communication;

FIG. 10 is a conceptual diagram illustrating for a Layer 2 Structure for Sidelink;

FIG. 11A is a conceptual diagram illustrating for User-Plane protocol stack for ProSe Direct Communication, and FIG. 11B is Control-Plane protocol stack for ProSe Direct Communication;

FIG. 12 shows an exemplary relationship of logical channels, PPP, LCG and ProSe group for describing BSR/LCP procedures to support ProSe priorities;

FIG. 13 is a diagram for transmitting a BSR in a D2D communication system according to embodiments of the present invention; and FIG. 14 shows examples of mapping relationships between PPP and LCG according to embodiments of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level re-quirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS ter-restrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer estab-lishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about con-nections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce un-necessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 6 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

Meanwhile, UEs that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report (BSR).

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data available transmission across all logical channels in a logical-channel group.

The Buffer Status Reporting (BSR) procedure is used to provide a serving eNB with information about the amount of data available for transmission (DAT) in the UL buffers of the UE. RRC may control BSR reporting by configuring the three timers pe-riodicBSR-Timer and retxBSR-Timer and logicalChannelSR-ProhibitTimer and by, for each logical channel, optionally signaling Logical Channel Group (LCG) which allocates the logical channel to an LCG.

The Sidelink (SL) BSR procedure is used to provide the serving eNB with information about the amount of sidelink data available for transmission in the SL buffers associated with the MAC entity. RRC controls BSR reporting for the sidelink by configuring the two timers periodic-BSR-TimerSL and retx-BSR-TimerSL. Each Sidelink logical channel belongs to a ProSe Destination. Each sidelink logical channel is allocated to a LCG depending on the priority of the sidelink logical channel and the mapping between LCG ID and priority which is provided by upper layers in logicalChGroupInfoList. LCG is defined per ProSe Destination.

A Sidelink BSR shall be triggered if any of the following events occur: if the MAC entity has a configured SL-RNTI i) SL data, for a sidelink logical channel of a ProSe Destination, becomes available for transmission in the RLC entity or in the PDCP entity and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR", ii) UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR", iii) retx-BSR-TimerSL expires and the MAC entity has data available for transmission for any of the sidelink logical channels, in which case the Sidelink BSR is referred below to as "Regular Sidelink BSR", iv) periodic-BSR-TimerSL expires, in which case the Sidelink BSR is referred below to as "Periodic Sidelink BSR". Else, An SL-RNTI is configured by upper layers and SL data is available for transmission in the RLC entity or in the PDCP entity, in which case the Sidelink BSR is referred below to as "Regular Sidelink BSR".

For Regular and Periodic Sidelink BSR, if the number of bits in the UL grant is equal to or larger than the size of a Sidelink BSR containing buffer status for all LCGs having data available for transmission plus its subheader, the MAC entity reports Sidelink BSR containing buffer status for all LCGs having data available for transmission. Else, the MAC entity reports Truncated Sidelink BSR containing buffer status for as many LCGs having data available for transmission as possible, taking the number of bits in the UL grant into consideration.

If the Buffer Status reporting procedure determines that at least one Sidelink BSR has been triggered and not cancelled: if the MAC entity has UL resources allocated for new transmission for this TTI and the allocated UL resources can accommodate a Sidelink BSR MAC control element plus its subheader as a result of logical channel prioritization, the MAC entity instructs the Multiplexing and Assembly procedure to generate the Sidelink BSR MAC control element(s), starts or restarts periodic-BSR-TimerSL except when all the generated Sidelink BSRs are Truncated Sidelink BSRs, and starts or restarts retx-BSR-TimerSL.

Else if a Regular Sidelink BSR has been triggered, if an uplink grant is not configured, a Scheduling Request shall be triggered.

A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.

The MAC entity shall restart retx-BSR-TimerSL upon reception of an SL grant.

All triggered regular Sidelink BSRs shall be cancelled in case the remaining configured SL grant(s) valid for this SC Period can accommodate all pending data available for transmission. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.

The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.

Meanwhile, Proximity-based Service (ProSe) has been discussed in 3GPP Recently. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity.

Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

FIG. 7 is an example of default data path for communication between two UEs. With reference to FIG. 7, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

FIGS. 8 and 9 are examples of data path scenarios for a proximity communication. If wireless devices (e.g., UE1, UE2) are in proximity of each other, they may be able to use a direct mode data path (FIG. 8) or a locally routed data path (FIG. 9). In the direct mode data path, wireless devices are connected directly each other (after appropriate procedure(s), such as authentication), without eNB and SGW/PGW. In the locally routed data path, wireless devices are connected each other through eNB only.

FIG. 10 is a conceptual diagram illustrating for a Layer 2 structure for Sidelink.

Sidelink communication is a mode of communication whereby UEs can com-municate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation UE(s) may act as a synchronization source by transmitting Sidelink Broadcast Control Channel (SBCCH) and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signalled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order:
  Uu transmission/reception (highest priority);
  PC5 sidelink communication transmission/reception;
  PC5 sidelink discovery announcement/monitoring (lowest priority).

FIG. 11A is a conceptual diagram illustrating for User-Plane protocol stack for ProSe Direct Communication, and FIG. 11B is Control-Plane protocol stack for ProSe Direct Communication.

FIG. 11A shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11A.

User plane details of ProSe Direct Communication: i) there is no HARQ feedback for sidelink communication, ii) RLC Unacknowledged mode (UM) is used for sidelink communication, iii) RLC UM is used for sidelink communication, iv) a receiving RLC UM entity used for sidelink communication does not need to be configured prior to reception of the first RLC UM Mode Data (UMD) PDU, and v) Robust Header Compression (ROHC) Unidirectional Mode is used for header compression in PDCP for sidelink communication.

A UE may establish multiple logical channels. LCID included within the MAC subheader uniquely identifies a logical channel within the scope of one Source Layer-2 ID and ProSe Layer-2 Group ID combination. Parameters for logical channel prioritization are not configured. The Access stratum (AS) is provided with the ProSe Per-Packet Priority (PPPP) of protocol data unit transmitted over PC5 interface by higher layer. There is a PPPP associated with each logical channel.

FIG. 11B shows the protocol stack for the control plane.

A UE does not establish and maintain a logical connection to receiving UEs prior to one-to-many a sidelink communication. Higher layer establish and maintain a logical connection for one-to-one sidelink communication including ProSe UE-to-Network Relay operation. The Access Stratum protocol stack for SBCCH in the PC5 interface consists of RRC, RLC, MAC and PHY as shown below in FIG. 11B.

Over PC5 interface, Per-Packet Priority (PPP) is used to prioritize a certain packet, where the priority is independent with ProSe destination or ProSe UE. In order to prioritize the packet with higher priority over Uu interface as well, the Relay UE needs to know the priority of the packet so that the Relay UE provides more opportunities of transmission to the packet with higher priority.

Regarding ProSe Per-Packet Priority (PPPP), it may be assumed as follows: i) a single UE shall be able to transmit packets of different priorities on PC5, ii) the UE upper layers provide to the access stratum a ProSe Per Packet Priority from a range of possible values, iii) the ProSe Per Packet Priority is used to support preferential transmission of packets both intra-UE and across different UEs, iv) the support of 8 priority levels for the ProSe Per Packet Priority should be sufficient, v) the ProSe Per Packet Priority applies to all PC5 traffic, and vi) the ProSe Per Packet Priority is independent of the layer-2 destination of the transmission.

Meanwhile, to support ProSe priorities, BSR and LCP procedures may have to be changed from LTE Rel-12, and it will be described with reference to FIG. 12.

FIG. 12 shows an exemplary relationship of logical channels, PPP, LCG and ProSe group for describing BSR/LCP procedures to support ProSe priorities.

In Rel-12, a lot about supporting Group priority in BSR and LCP procedures have been discussed, but finally it is decided that ProSe priority is not supported in Rel-12. Consequently, BSR/LCP procedures in Rel-12 becomes as follows: i) The UE assigns a logical channel priority to a sidelink logical channel by UE implementation, ii) The UE maps sidelink logical channels to a LCG with LCG ID set to '11', iii) When sending a SL BSR, the UE includes buffer status (BS) of all ProSe groups having SL data as many as it can. Which ProSe group's BS should be included first is up to UE implementation, and iv) When the UE receives a SL grant, the UE selects one ProSe group by UE implementation, and performs LCP procedure for logical channels belonging to the selected ProSe group.

In contrast, in Rel-13, it is decided that Per Packet Priority (PPP) for each PDCP SDU is provided, and up to 8 priority levels are supported for all PC5 traffic. Then, it seems obvious that the Rel-12's BSR/LCP procedures need to be modified, thus there are some proposals for supporting the PPP as follows: i) Proposal 1: The UE assigns a logical channel priority to a sidelink logical channel based on PPP, ii) Proposal 2: Define LCG per ProSe group, and, within one ProSe group, each sidelink logical channel is mapped to one of four LCGs depending on the PPP of the sidelink logical channel, iii) Proposal 3: When sending a SL BSR, the UE includes BS of all LCGs having SL data among all ProSe groups as many as it can. The BS of LCG having the sidelink logical channel with the highest PPP should be included first, iv) Proposal 3a: For SL BSR, the UE include BS of LCGs in decreasing priority order of LCG priority (the highest PPP of sidelink logical channels belonging to the LCG), v) Proposal 4: When the UE receives a SL grant, the UE selects the ProSe group having the sidelink logical channel with the highest PPP among the sidelink logical channels having SL data, and performs LCP procedure for all sidelink logical channels belonging to the selected ProSe group.

Meanwhile, there is one issue in the Proposal 3. If UL resource remains after including the highest priority LCG (i.e., a LCG having sidelink logical channel with the highest PPP), in which order the UE should include BS of remaining LCGs? Regarding this, two options may be considered.

In first Option, the UE may set a LCG priority to the highest PPP of sidelink logical channels belonging to the LCG, and include BS of LCGs in decreasing priority order of the LCG priority. Table 1 shows an example of SL BSR construction according to the first Option, in case of FIG. 12. Referring to FIG. 12, the LCG priority is LCG0>LCG3>LCG2. Thus, the SL BSR is filled in order of BS of LCG0, BS of LCG3, and BS of LCG2, as shown in Table 1.

TABLE 1

| ProSe group 13 | LCG 0 | BS of LCG 0 of ProSe group 13 |
| ProSe group 27 | LCG 3 | BS of LCG 3 of ProSe group 27 |
| ProSe group 13 | LCG 2 | BS of LCG 2 of ProSe group 13 |
| ProSe group 27 | LCG 2 | BS of LCG 2 of ProSe group 27 |

In second Option, the UE set a ProSe group priority to the highest PPP of sidelink logical channels belonging to the ProSe group, and include BS of LCGs in decreasing priority order of ProSe group priority. For the same ProSe group, include BS of LCGs in decreasing priority order of LCG priority. Table 2 shows an example of SL BSR construction according to the second Option, in case of FIG. 12. Referring to FIG. 12, the ProSe group priority is ProSe group 13>ProSe group 27. Thus, the SL BSR is filled in order of BS with ProSe group 13, and BS with ProSe group 27, as shown in Table 2.

TABLE 2

| | | |
|---|---|---|
| ProSe group 13 | LCG 0 | BS of LCG 0 of ProSe group 13 |
| ProSe group 13 | LCG 2 | BS of LCG 2 of ProSe group 13 |
| ProSe group 27 | LCG 3 | BS of LCG 3 of ProSe group 27 |
| ProSe group 27 | LCG 2 | BS of LCG 2 of ProSe group 27 |

As discussed above, in Rel-13, each sidelink logical channel would be mapped to a specific PPPP of SL data. The intention is to prioritize SL data having higher PPPP. Meanwhile, there is an agreement regarding LCG aspect, define LCG per ProSe destination and within one ProSe destination, each sidelink logical channel is mapped to one of four LCGs depending on the PPPP of the sidelink logical channel. However, there is no agreement about how to map PPPP to a LCG.

In ProSe BSR, the buffer status is reported per LCG, where LCG is defined per ProSe Destination and each LCG is mapped to certain PPPPs. By reporting the buffer status per LCG which mapped to a certain PPPPs, the eNB can know how many data of certain PPPPs are stored in the UE side. Thus, the eNB can schedule the sidelink resource by taking the PPPP of data into account.

For this, the UE needs to receive an RRC configuration signal which indicates the LCG and PPPP mapping. As an alternative, it is possible to indicate each LCG ID and its associated PPPPs so that the UE can explicitly know the mapping between the LCG and the PPPPs. However, this would increase the signaling overhead.

As there is always 4 LCGs having LCG IDs from 00 (=0) to 11 (=3) per each ProSe Destination, it wouldn't be necessary to explicitly indicate the LCG IDs for LCG-PPPP mapping. Instead, a method with reduced signaling overhead can be considered.

FIG. 13 is a diagram for allocating priorities to a logical channel group implicitly in a D2D communication system according to embodiments of the present invention.

It is invented that when an UE receives an LCG-priority mapping from an eNB, the UE associates the Priority List included in the LCG-priority mapping with an LCG in pre-defined order of LCG IDs.

The UE receives information including one or more priority lists from an eNB (S1301). The information includes N numbers of priority lists in order of increasing logical channel group identity.

Here, the N is the number of logical channel groups configured to the UE, and one of the N numbers of priority lists indicates one or more priorities associated with a logical channel group.

For example, the first Priority List of the N numbers of priority lists included in the information is for a Priority List of a LCG having the lowest LCG ID, e.g., 00 (=0), and the last Priority List of the N numbers of priority lists in the information is for a Priority List of a LCG having the highest LCG ID, e.g., 11 (=3).

For example, in order to configure LCG-priority mapping for 4 LCGs, the LCG-priority mapping includes 4 Priority Lists.

Preferably, the eNB sends an RRC signal including the information including one or more priority lists. The RRC signal can be logicalChGroupInfoList Information Element.

When the UE receives the information from the eNB, the UE associates each of the N numbers of priority lists with each of the N numbers of logical channel groups in an order corresponding to a sequential order of the information (S1303).

Here, a logical channel group of the associated N numbers of logical channel groups is associated with one or more priorities indicated by a priority list associated with the logical channel group.

For example, the UE associates the PPPPs in the first Priority List with the LCG having the lowest LCG ID, e.g., 00 (=0). And, the UE associates the PPPPs in the second Priority List with the LCG having the second lowest LCG ID, e.g., 01 (=1), and so on. Finally, the UE associates the PPPPs in the last Priority List with the LCG having the highest LCG ID, e.g., 11 (=3).

When being configured with a sidelink logical channel, the UE allocates the sidelink logical channel to an LCG according to the PPPP associated with the sidelink logical channel, and the PPPPs associated with the LCG (S1305). Thus, when a sidelink logical channel with a first priority is configured, the UE allocates the sidelink logical channel with the first priority to a logical channel group associated with the first priority.

Meanwhile, when reporting the buffer status to the eNB, the UE reports the buffer status per LCG by calculating the amount of data of the sidelink logical channels associated with each LCG.

FIG. 14 is an example for allocating priorities to a logical channel group implicitly in a D2D communication system according to embodiments of the present invention.

Let's assume that if the UE is configured 4 LCGs including LCG 1 with LCG ID=00 (or 0), LCG 2 with LCG ID=01 (or 1), LCG 3 with LCG ID=10(or 2), and LCG 4 with LCG ID=11 (or 3), the information includes 4 priority lists (See, Table A).

And a first priority list includes PPPP0, a second priority list includes PPPP1, and PPPP2, a third priority list includes PPPP3 and PPPP4, and the last priority list includes PPPP5, PPPP6, PPPP7, and PPPP8 (See, Table B).

In this case, if the UE receives information including 4 priority lists from an eNB, the first priority list including PPPP0 is for LCG 1, the second priority list including PPPP1, and PPPP2 is for LCG 2, the third priority list including PPPP3 and PPPP4 is for LCG 3, and the last priority list including PPPP5, PPPP6, PPPP7, and PPPP8 is for LCG 4, because the information includes 4 priority lists in order of increasing logical channel group identity.

Accordingly, when the UE associates each of the 4 priority lists with each of 4 LCGs, the LCG 1 is associated with PPPP0 in the first priority list, the LCG 2 is associated with PPPP1 and PPPP2 in the second priority list, the LCG 3 is associated with PPPP3 and PPPP4 in the third priority list, and the LCG 4 is associated with PPPP5, PPPP6, PPPP7 and PPPP8 in the fourth priority list (See, Table C).

Just receiving the information including priority lists makes the UE know LCG-PPPP mapping relation. This method is for implicit allocation of LCG-PPPP mapping. Using this method, it wouldn't be necessary to explicitly indicate the LCG IDs for LCG-PPPP mapping. It can be reduced signaling overhead.

In this case, when the UE configures a first sidelink logical channel with PPPP1, a second sidelink logical channel with PPPP2, and a third sidelink logical channel with PPPP4, the first sidelink logical channel and the second sidelink logical channel are allocated to the LCG 2, and the third logical channel is allocated to the LCG 3 (See, Table D).

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method of a User Equipment (UE) operating in a wireless communication system, the method comprising:
receiving, from an evolved NodeB (eNodeB), information including 4 priority lists,
wherein the information does not include identities of 4 logical channel groups,
wherein each of the 4 priority lists includes one or more priorities,
wherein each of the 4 priority lists is sequentially associated with each of the 4 logical channel groups in an order of increasing identities of the 4 logical channel groups,
wherein a first priority list of the 4 priority lists is associated with a first logical channel group having a lowest logical channel group identity, a second priority list of the 4 priority lists is associated with a second logical channel group having a second lowest logical channel group identity, a third priority list of the 4 priority lists is associated with a third logical channel group having a second highest logical channel group identity, and a last priority list of the 4 priority lists is associated with a fourth logical channel group having a highest logical channel group identity; and
based on a sidelink logical channel with a specific priority being configured and the information, allocating the sidelink logical channel with the specific priority to a corresponding logical channel group associated with a priority list including the specific priority among the 4 priority lists.

2. The method according to claim 1, wherein each of the one or more priorities is a ProSe Per-Packet Priority.

3. The method according to claim 1, wherein the information is received via an RRC (radio resource control) signaling.

4. The method according to claim 1, wherein the information is logicalChGroupInfoList.

5. A User Equipment (UE) for operating in a wireless communication system, the UE comprising:
a receiver configured to receive signals; and
a processor operably coupled with the receiver and configured to:
receive, from an evolved NodeB (eNodeB), information including 4 priority lists,
wherein the information does not include identities of 4 logical channel groups,
wherein each of the 4 priority lists includes one or more priorities,
wherein each of the 4 priority lists is sequentially associated with each of the 4 logical channel groups in an order of increasing identities of the 4 logical channel groups,
wherein a first priority list of the 4 priority lists is associated with a first logical channel group having a lowest logical channel group identity, a second priority list of the 4 priority lists is associated with a second logical channel group having a second lowest logical channel group identity, a third priority list of the 4 priority lists is associated with a third logical channel group having a second highest logical channel group identity, and a last priority list of the 4 priority lists is associated with a fourth logical channel group having a highest logical channel group identity, and based on a sidelink logical channel with a specific priority being configured and the information, allocate the sidelink logical channel with the specific priority to a corresponding logical channel group associated with a priority list including the specific priority among the 4 priority lists.

6. The UE according to claim 5, wherein each of the one or more priorities is a ProSe Per-Packet Priority.

7. The UE according to claim 5, wherein the information is received via an RRC (radio resource control) signaling.

8. The UE according to claim 5, wherein the information is logicalChGroupInfoList.

\* \* \* \* \*